United States Patent [19]

Nilssen

[11] Patent Number: 5,180,950

[45] Date of Patent: *Jan. 19, 1993

[54] POWER-FACTOR-CORRECTED ELECTRONIC BALLAST

[76] Inventor: Ole K. Nilssen, Caesar Dr., Barrington, Ill. 60010

[*] Notice: The portion of the term of this patent subsequent to Mar. 1, 2005 has been disclaimed.

[21] Appl. No.: 737,394

[22] Filed: Jul. 29, 1991

Related U.S. Application Data

[63] Continuation-in-part of Ser. No. 663,052, Feb. 27, 1991, which is a continuation of Ser. No. 517,472, May 2, 1990, abandoned, which is a continuation of Ser. No. 11,261, Feb. 5, 1987, abandoned, which is a continuation-in-part of Ser. No. 9,822, Feb. 2, 1987, Pat. No. 4,745,539, which is a continuation-in-part of Ser. No. 963,455, Dec. 1, 1986, Pat. No. 4,729,081.

[51] Int. Cl.$^5$ .............................................. H05B 37/00
[52] U.S. Cl. ................................ 315/127; 315/209 R; 315/247; 315/244; 315/170; 315/194; 315/DIG. 5; 315/DIG. 7; 363/37; 363/46; 363/89; 363/125; 323/319; 323/235
[58] Field of Search .................. 315/278, 209 R, 210, 315/246, 241 R, 207, 208, 219, 247, 244, 170, 194, 195, DIG. 5, DIG. 7; 363/37, 45, 46, 84, 89, 48, 98, 125; 323/235, 236, 319; 320/1

[56] References Cited

U.S. PATENT DOCUMENTS

| | | | |
|---|---|---|---|
| 3,389,299 | 6/1968 | Bell | 315/DIG. 7 |
| 3,448,335 | 6/1969 | Gregory et al. | 315/DIG. 7 |
| 3,912,969 | 10/1975 | Nakai et al. | 315/278 |
| 4,729,081 | 3/1988 | Nilssen | 363/48 |
| 4,745,539 | 5/1988 | Nilssen | 363/98 |

Primary Examiner—Paul M. Dzierzynski
Assistant Examiner—Michael B. Shingleton

[57] ABSTRACT

In a power-factor-corrected electronic ballast, an AC/DC converter comprises a half-bridge electronic self-oscillating inverter powered from non-filtered full-wave-rectified 120 Volt/60 HZ power line voltage, and its resulting amplitude-modulated 30 kHz output voltage is applied to a series-resonant L-C circuit. The 30 kHz voltage developing across the tank capacitor of this L-C circuit is rectified and applied as direct current to an energy-storing capacitor, from which a DC supply voltage is provided to a frequency-converting ballast which, in turn, provides a substantially non-modulated high-frequency AC output voltage used for powering a gas discharge lamp via a current-limiting inductor. Trigger pulses are provided to trigger the inverter into self-oscillation at the beginning of each pulse of DC voltage provided by the unfiltered rectified power line voltage. As soon as the magnitude of the DC voltage across the energy-storing capacitor exceeds a first level, the trigger pulses cease to be provided. As soon as the magnitude of the DC voltage on the energy-storing capacitor falls below a second level, the trigger pulses are again provided. As long as the inverter is in operation, the current pulled from the power line is essentially of constant magnitude and therefore providing for a power factor of about 90%.

25 Claims, 2 Drawing Sheets

POWER-FACTOR-CORRECTED ELECTRONIC BALLAST

RELATED APPLICATIONS

This application is a continuation-in-part of Ser. No. 07/663,052 filed Feb. 27, 1991, which is a continuation of Ser. No. 07/663,052 filed May 2, 1990, now abandoned; which is a continuation of Ser. No. 07/011,261 filed Feb. 5, 1087; which is a continuation-in-part of Ser. No. 07/009,822 filed Feb. 2, 1987, now U.S. Pat. No. 4,745,539; which is a continuation-in-Part of Ser. No. 06/963,455 filed Dec. 1, 1986, now U.S. Pat. No. 4,729,081.

BACKGROUND OF THE INVENTION

Field of Invention

The present invention relates to power-line-operated electronic ballasts for gas discharge lamps, particularly of a type drawing power from the power line with a relatively high power factor.

SUMMARY OF THE INVENTION

Objects of the Invention

One object of the present invention is that of providing a power-line-operated electronic ballast operative to draw power from the power line with a relatively high power factor.

This as well as other objects, features and advantages of the present invention will become apparent from the following description and claims.

BRIEF DESCRIPTION

In a power-line-operated power-factor-corrected electronic ballast, an AC/DC converter is used for providing a DC supply voltage of substantially constant magnitude for a ballast inverter which, in turn, provides a substantially non-amplitude-modulated squarewave voltage at an inverter output connected with a gas discharge lamp by way of a current-limiting inductor.

The AC/DC converter itself comprises a half-bridge electronic self-oscillating inverter powered from non-filtered full-wave-rectified 120Volt/60Hz power line voltage. Its resulting amplitude-modulated 30 kHz output voltage is applied to a series-resonant L-C circuit. The 30 kHz voltage developing across the tank capacitor of this L-C circuit is rectified and applied as direct current to an energy-storing capacitor, from which the ballast inverter's DC supply voltage is provided.

In the AC/DC converter, trigger pulses are provided to trigger the half-bridge inverter into self-oscillation at the beginning of each DC voltage pulse provided by the unfiltered rectified power line voltage. As soon as the magnitude of the DC voltage across the energy-storing capacitor exceeds a first level, the trigger pulses cease to be provided. As soon as the magnitude of the DC voltage on the energy-storing capacitor falls below a second level, which is lower than the first level by about 10.0%, the trigger pulses are again provided.

As long as the half-bridge inverter in the AC/DC converter is in operation, the current pulled from the power line is essentially of constant magnitude and therefore providing for a power factor of about 90%.

Thus, at maximum load, power is pulled by the AC/DC converter from the power line continuously and at a high power factor. At below maximum load, the inverter cycles on and off in such manner as to keep the energy-storing capacitor fully charged; and power is then pulled from the power line at high power factor in intermittent spurts.

Thus, at less than maximum average power draw, subject power-factor-corrected electronic ballast draws power from the power line in a so-called bang-bang fashion: either pulling power at a certain relatively high rate, or not pulling power at all.

DESCRIPTION OF THE PREFERRED EMBODIMENT

Details of Construction

Figure 1:
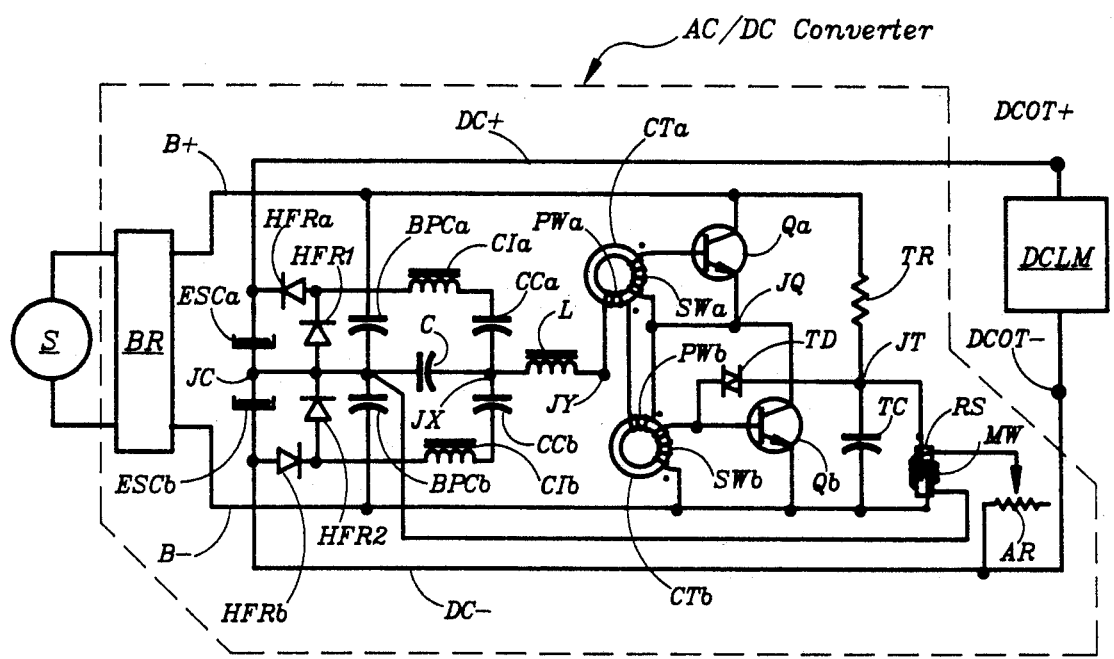
FIG. 1 illustrates the preferred embodiment of the AC/DC converter.

In FIG. 1, a source S provides a 120Volt/60Hz voltage to a bridge rectifier BR, the DC output of which is applied between a B+ bus and a B− bus, with the B+ bus being of positive polarity. A first high-frequency bypass capacitor BPCa is connected between the B+ bus and a junction JC; and a second high-frequency bypass capacitor BPCb is connected between junction JC and the B− bus.

A first switching transistor Qa is connected with its collector to the B+ bus and with its emitter to a junction JQ; and a second switching transistor Qb is connected with its collector to junction JQ and with its emitter to the B− bus.

A tank capacitor C is connected between junction JC and a junction JX; a tank inductor L is connected between junction JX and a junction JY; and primary windings PWa and PWb of positive feedback saturable current transformers CTa and CTb, respectively, are connected in series between junction JY and junction JQ.

Secondary winding SWa of transformer CTa is connected between the base and emitter of transistor Qa; and secondary winding SWb of transformer CTb is connected between the base and the emitter of transistor Qb.

A first energy-storing capacitor ESCa is connected between junction JC and a positive DC bus DC+; and a second energy-storing capacitor ESCb is connected between junction JC and a negative DC bus DC−.

A first charging capacitor CCa is connected in series with a first charging inductor CIa to form a first series-combination, and this first series-combination is connected between junction JX and the anode of a high frequency rectifier HFRa. The cathode of rectifier HFRa is connected with the DC+bus. Another high frequency rectifier HFR1 is connected with its cathode to the anode of high frequency rectifier HFRa and with its anode to junction JC.

A second charging capacitor CCb is connected in series with a second charging inductor CIb to form a second series-combination, and this second series-combination is connected between junction JX and the cathode of a high frequency rectifier HFRb. The anode of rectifier HFRb is connected with the DC− bus. Another high frequency rectifier HFR2 is connected with its anode to the cathode of high frequency rectifier HFRb and with its cathode to junction JC.

A trigger resistor TR is connected between the B+ bus and a junction JT; and a trigger capacitor TC is connected between junction JT and the B− bus. A trigger Diac TD is connected between junction JT and the base of transistor Qb.

The contactor terminals of a magnetic reed switch RS are connected across trigger capacitor TC, which is to say: between junction JT and the B− bus. Around the reed switch is placed a magnetizing winding MW, the terminals of which are connected in series with an adjustable resistor AR to form a series-combination, and this series-combination is connected between junction JC and the DC− bus.

A DC load means DCLM is connected across DC output terminals DCOT+ and DCOT−; which DC output terminals are connected with the DC+ bus and the DC− bus, respectively. The whole assembly disposed between power line source S and DC load means DCLM is referred-to as AC/DC Converter.

Figure 3:
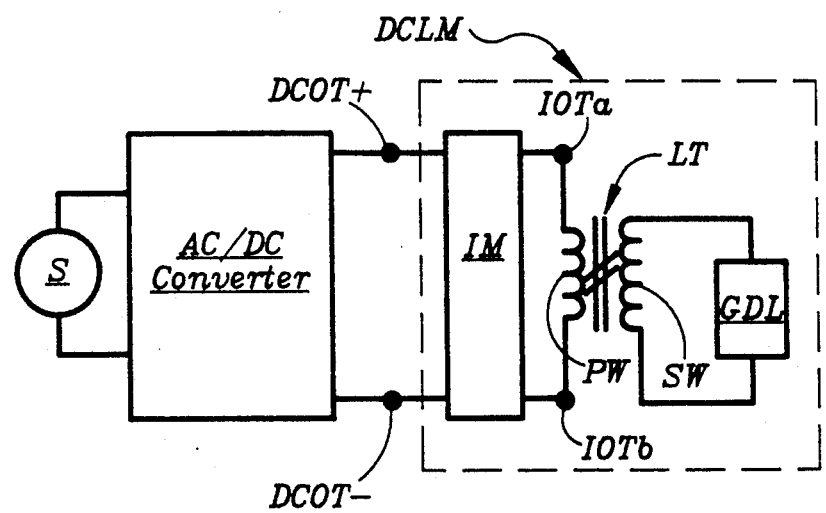
FIG. 3 illustrates the complete power-factor-corrected electronic ballast of the present invention.

In FIG. 3, the DC load means DCLM is shown to be a DC powered electronic ballast including an inverter means IM operative to provide a high frequency (30 kHz) AC voltage at a pair of inverter output teminals IOTa and IOTb. The primary winding PW of a leakage transformer LT is connected directly across output terminals IOTa and IOTb. A gas discharge lamp GDL is connected directly across the secondary winding SW of leakage transformer LT.

DETAILS OF OPERATION

Figure 2:
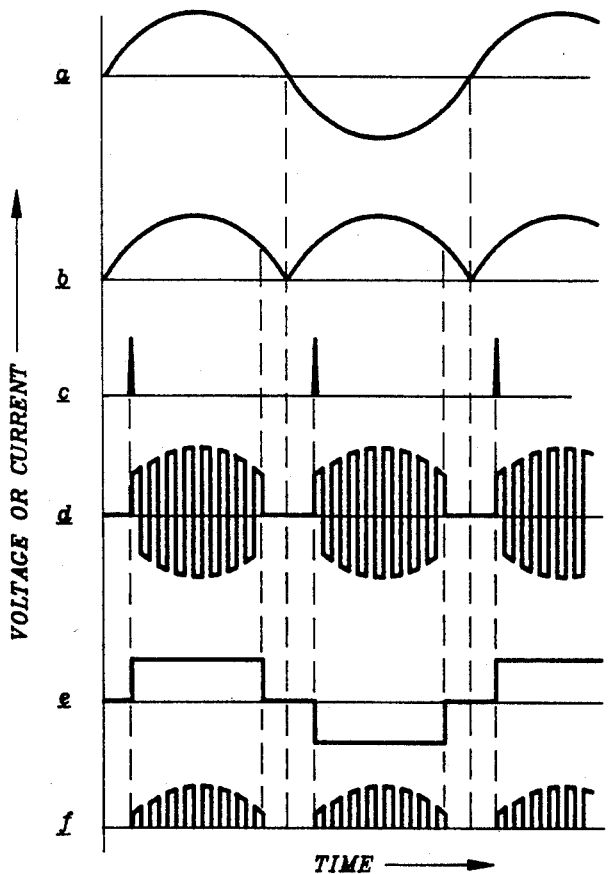
FIG. 2 illustrates various voltage and current waveforms associated with the AC/DC converter.

The detailed operation of the circuit of FIG. 1 may best be understood with reference to the various waveforms of FIG. 2, wherein:

FIG. 2a shows the waveform of the 120Volt/60Hz AC voltage provided from source S;

FIG. 2b shows the waveform of the full-wave-rectified 120Volt/60Hz AC voltage;

FIG. 2c shows the trigger pulses provided to the base of transistor Qb;

FIG. 2d shows the waveform of the high-frequency voltage provided between junctions JY and JC when the inverter is oscillating;

FIG. 2e shows the waveform of the current drawn from the 120Volt/60Hz AC voltage source S; and FIG. 2f shows the waveform of the charging current provided to one of the energy-storing capacitors ESCa/ESCb.

The circuit arrangement of FIG. 1 comprises a half-bridge inverter; which half-bridge inverter consists principally of the following components: bypass capacitors BPCa/BPCb, transistors Qa/Qb, and positive feedback current transformers CTa/CTb. The operation of such a self-oscillating half-bridge inverter is well known and is described in various ways in U.S. Pat. Nos. Re. 31,758, 4,506,318 and 4,581,562 to Nilssen.

The output of this half-bridge inverter is provided between junctions JC and JY and is illustrated in FIG. 2d as being an amplitude-modulated high-frequency voltage. Connected with the inverter's output, between junctions JC and JY, is a series-tuned L-C circuit consisting of tank inductor L and tank capacitor C. This series-tuned L-C circuit is series-resonant at or near the fundamental frequency of the inverter's amplitude-modulated high-frequency output voltage; which fundamental frequency is on the order of 30 kHz.

In the preferred embodiment, as long as indeed provided, the trigger pulses occur at a point approximately 30 degrees after the beginning of each sinusoidally-shaped DC supply voltage pulse (see FIGS. 2b/2c). Moreover, the inverter is arranged to cease oscillation whenever the instantaneous magnitude of its DC supply voltage falls below the level associated with a point just a little less than 30 degrees before the end of each sinusoidally-shaped DC supply voltage pulse. The resulting inverter output voltage will then be as illustrated in FIG. 2d; which results in a current draw from the AC voltage source (S) as illustrated in FIG. 2e and in a charging current provided to energy-storing capacitors ESC1/ESC2 as illustrated in FIG. 2f.

More particularly, being excited by the intermittent amplitude-modulated 30 kHz squarewave voltage of FIG. 2d, and being series-resonant at or near the 30 kHz fundamental frequency of this squarewave voltage, the voltage developed across the tank capacitor (C) will (by way of so-called Q-multiplication) increase in magnitude until it gets limited by loading; which means that it will increase to the point of providing substantial charging current to energy-storing capacitors ESCa and ESCb.

In turn, as long as the inverter operates to produce the output voltage indicated by FIG. 2d, the magnitude of the DC voltage developing across energy-storing capacitors ESCa and ESCb will increase (in a step-wise manner) until one or the other of the following events occur:

i) the current drain caused by DC load means DCLM equals the average charging current being provided from the inverter's output by way of the series-resonant L-C circuit;

ii) the magnitude of the voltage across energy-storing capacitor ESCb gets to be so high as to cause enough current to pass through magnetizing winding MW to cause reed switch RS to close, thereby causing the inverter to stop operation.

Thus, as long as the AC/DC converter of FIG. 1 is loaded at or beyond a certain level (by DC load means DCLM), the magnitude of the DC output voltage (which exists between DC output terminals DCOT+ and DCOT−) is either at or below a certain predetermined magnitude (which is determined by the setting of adjustable resistor AR), and the inverter then operates in the intermittently continuous manner shown in FIG. 2d.

On the other hand, if the AC/DC converter is loaded below said certain level, the magnitude of the DC output voltage will gradually increase until it exceeds the predetermined level. At that point the reed switch closes and the inverter ceases operation, thereby ceasing altogether to provide output.

Thereafter, the magnitude of the DC output voltage will gradually decrease until the amount of current flowing through magnetizing winding MW gets to be so low as to cause reed switch RS to open, thereby to cause the inverter to start operating again, thereby to cause the magnitude of the DC output voltage to start increasing again in a gradual step-wise manner (i.e., one step for each half-cycle of the power line voltage).

In other words, when loaded to or beyond a certain point, the inverter in the AC/DC converter will continuously operate in the (120 Hz) interrupted manner indicated by FIG. 2d; whereas, when loaded below that certain point, the inverter will *interruptedly* operate in the interrupted manner indicated by FIG. 2d (i.e., operating in a doubly interrupted manner).

While the rate of interruption of the inverter's output voltage is a constant 120 Hz, the rate at which this constant 120 Hz interruption is interrupted is dependent upon the degree of loading applied to DC output terminals DCOT1/DCOT2 as well as the degree of hysteresis built into the magnetic reed switch: the less hysteresis, the higher the rate of interruption; the less loading, the lower the rate of interruption.

As indicated in FIG. 3, DC load means DCLM is actually a DC powered electronic ballast means for a gas discharge lamp. In particular, another inverter means IM is connected with the DC output terminals DCOT+ and DCOT− of the AC/DC Converter; which other inverter means IM produces a high frequency (i.e., about 30 kHz) AC voltage at its inverter output terminals IOTa and IOTb. This high frequency output voltage is connected across primary winding PW of leakage transformer LT, across whose secondary winding SW is connected gas discharge lamp GDL.

The magnitude of the high frequency voltage provided across secondary winding SW is sufficient to cause the lamp to ignite; and the internal inductance of secondary winding SW is of such value as to limit the resulting lamp current to the desired level.

A leakage transformer must, on basis of its very function, operate with a magnetic leakage flux; which magnetic leakage flux must, in order to attain efficient transformer operation, be prevented from coupling with conductive dissipating objects external of the transformer.

Thus, if the electronic ballast means of FIG. 3 is housed in a steel casing—which in most real-life situations will in fact be the case—it is important to minimize coupling between the transformer's magnetic leakage flux and the steel walls of the casing. When using a leakage transformer with so-called E-type ferrite cores, to minimize coupling to the steel walls of a casing of usual shape and dimension (i.e., $2.2'' \times 1.5'' \times 8.4''$) the position of the leakage transformer should be such that the plane of the E-cores (i.e., a plane parallel with the magnetic flux lines) be perpendicular to the long axis of the ballast casing. Also, the transformer should be well removed from the end walls. That way, the magnetic leakage flux "sprays" out in both directions along the long axis of the casing and is quite diminished in magnitude at the point of coupling with the casing's end walls.

The worst position of the leakage transformer in such a steel casing is for the plane of its E-cores to be parallel with the base of the ballast casing—the base being one of the surfaces having the largest area.

Additional Comments a) The basic nature of a series-excited parallel-loaded high-Q resonant L-C circuit, when excited by a series-connected voltage source, is that of essentially constituting a current source to its parallel-connected load. Moreover, the magnitude of the current provided to the parallel-connected load is substantially proportional to the magnitude of the voltage provided by the series-connected voltage source.

Moreover, when such an L-C circuit is parallel-loaded with a substantially constant-voltage load (such as in instant case), the loading provided by the L-C circuit to the series-connected voltage source is substantially a constant-current. That is: a parallel-connected *constant-magnitude-voltage* load converts into a *constant-magnitude-current* load as seen from the viewpoint of a series-connected source.

b) One result of the above-described basic nature of a high-Q series-excited parallel-loaded resonant L-C circuit is that the magnitude of the charging current provided to the energy-storing capacitors ESC1/ESC2 (see FIG. 2f) is roughly proportional to the magnitude of the inverter output voltage (see FIG. 2d), which in turn in proportional to the magnitude of the inverter's DC supply voltage (see FIG. 2b).

c) Another result is that the magnitude of the current drawn by the inverter from its DC voltage supply will be about proportional to the magnitude of the DC voltage present across the energy-storing capacitors.

d) Yet another result is that the magnitude of the current drawn by the series-resonant L-C circuit when powering a constant-voltage parallel-connected load, is substantially constant.

Thus, since—for a given setting of the adjustable resistor (AR)—the magnitude of the *voltage* on the energy-storing capacitors is substantially constant, the magnitude of the current provided by the inverter into the series-tuned L-C circuit is approximately constant; which, in turn, means that the magnitude of the current drawn by the inverter from its DC supply voltage will be approximately constant—as indicated in FIG. 2e.

e) By virtue of their basic nature, magnetic reed switches have hysteresis. Thus, the magnitude of the current through the magnetizing winding (MW) required for causing the reed switch (RS) to close is higher than the magnitude of the current required to cause it to open.

Within a wide range, the amount of hysteresis can be designed to be just about any degree required. In the preferred embodiment, the hysteresis is about *20%*; which implies that the magnitude of the DC output voltage will be regulated to within about plus/minus *10%*.

f) By changing the setting of the adjustable resistor (AR), the magnitude of the DC output voltage can likewise be set.

In this connection, it is important to note that the magnitude of the DC output voltage can be set to virtually any level: higher or lower than the peak magnitude of the DC supply voltage, higher or lower than the peak magnitude of the inverter's output voltage, etc.

g) The half-bridge inverter of the AC/DC converter is so arranged as to oscillate approximately only in the intervals between 30 and 150 degrees, as well as between 210 and 330 degrees, of the 120Volt/60Hz supply voltage. As a result, current is drawn from the source only during those intervals; the implication of which is to minimize the third harmonic content of the current drawn from the source, which feature is important in situations where power is provided by a single phase of a three-phase power distribution system -- a situation that is frequently significant in connection with powering fluorescent lighting systems.

In fact, with the power line current having the particular waveform depicted by FIG. 2e and with the inverter in the AC/DC converter arranged to draw power line current only during the intervals between 30 and 150 degrees and between 210 and 330 degrees, the third harmonic component of the power line current is zero.

h) The current drawn from the power line by the circuit of FIG. 1 is illustrated by FIG. 2e in an idealized form, which would only occur if using perfect components, including an infinitely high Q of the L-C tuned circuit.

With such perfect components -- as long as the conduction angle of the current approximately covers the indicated two thirds of the total period of the power line voltage (i.e., the middle 120 degrees out of each half-cycle)—the power factor of the power drawn from the power line would be about 85%.

However, in reality, the current waveshape will not have quite as flat a top as is shown in FIG. 2e. Rather, the waveshape will exhibit a slightly curved top—with a raised center. As a result, the power factor of the power actually drawn from the power line will be closer to about 90%.

i) In FIG. 1, the principal purpose of elements CCa/CCb is that of providing DC isolation between junction JX and energy-storing capacitors ESCa/ESCb, and the principal purpose of elements CIa/CIb is that of improving rectification efficiency by way of mitigating the effect of the reverse recovery time of rectifiers HFRa/HFRb.

j) In overall operation, the circuit of FIG. 1 functions in such manner as to convert the unfiltered full-wave-rectified 120Volt/60Hz voltage (which is provided to the half-bridge inverter as a pulsed DC voltage source having near-negligible internal impedance) (see FIG. 2b) to a 30 kHz squarewave AC voltage provided at the inverter's output terminals JC and JY (see FIG. 2d). The internal source impedance associated with the inverter's output is also of near-negligible magnitude; which is to say that the inverter's DC supply voltage as well as the inverter's squarewave output voltage both constitute nearly perfect voltage sources.

On the other hand, by virtue of the action of the series-resonant L-C circuit, the AC output provided between output terminals JC and JX constitutes a near-perfect current source; which, of course, is equivalent to saying that the DC charging current provided to the two energy-storing capacitors (ESCa/ESCb) is provided from a near-perfect *current* source.

k) In the circuit arrangement of FIG. 1, for a given magnitude of the (constant-magnitude) DC voltage present between the DC— bus and DC+ bus, the magnitude of the current delivered (i.e., to rectifiers HFRa, HFR1, HFRb, HFR2) from the high-frequency AC voltage provided at junction NX is proportional to the magnitude of the high-frequency voltage provided at junction JQ. In turn, the magnitude of the high-frequency voltage provided at junction JQ is proportional to the magnitude of the DC voltage present between the B— bus and the B+ bus. In further turn, this means that (for a constant-magnitude DC voltage present between the DC— bus and the DC+ bus) the magnitude of the current drawn by the inverter from the DC supply voltage provided between the B— bus and B+ bus is substantially constant.

In other words, the magnitude of the current drawn by the inverter (i.e., the inverter consisting of main components Qa, Qb, CTa, CTb, BPCa, BPCb) is substantially proportional to the magnitude of the DC voltage present between the DC— bus and the DC+ bus.

One particularly important feature of the circuit arrangement of FIG. 1 is the following.

Whenever the magnitude of the DC voltage existing between the DC— bus and the DC+ bus (i.e., across energy-storing capacitors ESCa and ESCb) exceeds a certain level, reed switch RS closes, whereafter this reed switch will remain closed until the magnitude of this DC voltage falls well below this certain level. Thus, after having reached the level at which the reed switch closes, as soon as the magnitude of the DC voltage existing between the B— bus and the B+ bus decreases below the level required for sustaining inverter oscillation (which, as indicated in FIG. 2b, occurs once every half-cycle of the power line voltage) the inverter stops oscillating and will not start oscillating again until it receives a trigger signal. However, a trigger signal will not be provided as long as the reed switch (RS) is closed; which means that the inverter will not start oscillating again until the magnitude of the DC voltage between the DC— bus and the DC+ bus decreases, sufficiently for the reed switch (SW) to re-open.

One important result of this feature is that whenever the magnitude of the load current drawn by the DC load means (DCLM) is relatively low, the magnitude of the DC voltage existing between the DC— bus and the DC+ bus will reach the above-mentioned certain level; and, since the load current is indeed relatively low, it will now take some time—such as one or more half-cycles of the power line voltage—before sufficient charge has been removed from the energy-storing capacitors (ESCa and ESCb) to cause the magnitude of this DC voltage to fall to a level low enough to cause the reed switch to re-open.

In other words, whenever the DC load means represents a relatively light load, inverter oscillation will occur in spurts in the sense that it will oscillate for one or a few half-cycles of the power line voltage (i.e., until the magnitude of the DC voltage between the DC— bus and the DC+ bus reaches said certain level) and then refrain from oscillating for one or more half-cycles of the power line voltage (i.e., until the magnitude of the DC voltage between the DC— bus and the DC+ bus falls to a level low enough to cause the reed switch to re-open).

It is noted that the current required to activate the reed switch is drawn from across one of the two energy-storing capacitors; the voltage across which has a magnitude that is a direct reflection of the magnitude of the DC voltage present between the DC— bus and the DC+ bus. This practice is acceptable as long as the magnitude of the current required for activating the reed switch is very small compared with the magnitude of the current drawn by the various types of DC load means.

m) It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. In an electronic ballast means for a gas discharge lamp, the combination comprising:

first means operable to connect with the relatively low frequency voltage of an ordinary electric utility power line and, when so connected, conditionally operative to provide a relatively high frequency AC voltage at an AC output; the first means having control means operative, during any period when receiving a control action, to prevent the first means from providing the relatively high frequency AC voltage;

second means connected in circuit between the AC output and a DC output; the second means being operative to provide a unidirectional current to an energy-storing capacitor means connected with the DC output; a DC voltage being thereby provided at this DC output; and third means connected between the DC output and the control means and operative to provide said control action whenever the magnitude of the DC voltage exceeds a predetermined level.

2. The arrangement of claim 1 wherein the second means is further characterized by being operative to cause the magnitude of the unidirectional current to be approximately proportional to the magnitude of the AC voltage, substantially irrespective of the magnitude of the DC voltage.

3. The arrangement of claim 1 wherein the first means comprises: i) rectifier means operative to connect with the power line and then to provide a unidirectional voltage having an instantaneous absolute magnitude approximately equal to that of the relatively low frequency voltage, and ii) inverter means connected with this unidirectional voltage and operative to provide said relatively high frequency AC voltage.

4. The arrangement of claim 1 wherein, whenever the relatively high frequency AC voltage is being provided at the AC output, its instaneous absolute magnitude is substantially proportional to that of the relatively low frequency voltage on the power line.

5. The arrangement of claim 1 wherein said relatively high frequency AC voltage is characterized by being interrupted with periods of zero magnitude at a frequency twice that of the relatively low frequency voltage on the power line.

6. In a power-line-operated electronic ballast for a gas discharge lamp, a combination comprising:
first means operable to connect with the relatively low frequency voltage on an ordinary electric utility power line and to provide a relatively high frequency AC voltage at a pair of AC output terminals; the relatively high frequency AC voltage being characterized by: (i) being interrupted with periods of essentially zero magnitude; and (ii) having an instantaneous absolute magnitude substantially proportional to that of the relatively low frequency voltage except during the periods of essentially zero magnitude;

second means connected with the AC output terminals and operative to provide a DC voltage at a pair of DC terminals; the magnitude of the DC voltage being substantially constant over at least the duration of a complete period of the relatively low frequency voltage; and load means connected with the DC terminals.

7. The combination of claim 6 wherein the first means draws current from the power line during the larger part of the duration of each period of the relatively low frequency voltage.

8. The combination of claim 7 wherein the first means draws current from the power line only during approximately two thirds of the duration of each period of the relatively low frequency voltage.

9. The combination of claim 7 wherein the magnitude of the current drawn from the power line is approximately constant during any time when current is indeed being drawn from the power line.

10. The combination of claim 6 wherein the DC powered ballast means includes leadage transformer means.

11. The combination of claim 6 wherein each of said periods of essentially zero magnitude is shorter in duration than half of a complete half-cycle of the relatively low frequency voltage.

12. The combination of claim 11 wherein each of said periods is of duration about equal to one third of said complete half-cycle.

13. In a power-line-operated electronic ballast for a gas discharge lamp, a combination comprising:
rectifier means connected with the power line voltage from an ordinary electric utility power line and operative to provide at a first DC output a first DC voltage having an instaneous absolute magnitude approximately equal to that of the power line voltage;

inverter means connected with the first DC output and operative to provide an AC voltage at an AC output; the frequency of the AC voltage being substantially higher than that of the power line voltage; the instantaneous absolute magnitude of the AC voltage being substantially proportional to that of the power line voltage; and conversion means connected with the AC output and operative to provide a second DC voltage at a second DC output; the magnitude of the second DC voltage being substantially constant; the magnitude of the current drawn by the conversion means from the AC output being substantially independent of the magnitude of the AC voltage; a DC load means being connected with the second DC output;

whereby the magnitude of the current drawn by the rectifier means from the power line is substantially constant for as long as current is being provided to the conversion means from the AC output.

14. In a power-line-operated electronic ballast for a gas discharge lamp, a combination comprising:
first means conditionally operative to provide a periodically intermittent AC voltage at an AC output; the first means having prevent means operative in response to a control action to prevent the provision of the periodically intermittent AC voltage;

second means connected with the AC output and operative to provide a DC voltage at a DC output; an energy-storing means and a DC load means being connected in circuit with the DC output; and third means connected in circuit between the DC output and the prevent means; the third means being responsive to the magnitude of the DC voltage and operative, whenever the magnitude of the DC voltage exceeds a first predetermined level, to provide said control action.

15. The arrangement of claim 14 wherein the third means is operative, whenever the magnitude of the DC voltage decreases below a second predetermined level, to cease providing said control action.

16. In a power-line-operated electronic ballast for a gas discharge lamp, a combination comprising:
first means operable to connect with the power line voltage on an ordinary electric utility power line and operative, when so connected, to provide a first DC voltage at a first DC output; the output impedance of the first DC output being relatively low; the instantaneous absolute magnitude of the first DC voltage being about the same as that of the power line voltage;

second means connected with the DC output and operative to provide an AC voltage at an AC output; the output impedance of the AC output being relatively low; the AC voltage being: i) of instantaneous absolute magnitude substantially proportional to that of the first DC voltage, and ii) of frequency substantially higher than that of the power line voltage;

third means connected with the AC output and operative to provide a unidirectional current at a second DC output; the output impedance of the second DC output being relatively high; and energy-storing capacitor means having DC terminal means connected with the second DC output and operative to receive the unidirectional current provided therefrom, thereby to develop a second DC voltage at the DC terminal means; the magnitude of the second DC voltage being substantially constant for the duration of a complete cycle of the power line voltage, the DC terminal means being connected with a DC load means.

17. The arrangement of claim 16 wherein the third means includes a series-tuned L-C circuit having a tank capacitor and a tank inductor connected in series; this series-tuned L-C circuit being: i) connected across the AC output, and ii) series-resonant at or near the fundamental frequency of the AC voltage.

18. The arrangement of claim 17 wherein the third means also includes rectifier means connected in circuit between the tank capacitor and the second DC output, thereby providing for the series-tuned L-C circuit to be series-excited and parallel-loaded.

19. The arrangement of claim 16 including adjustment means connected in circuit between the energy-storing capacitor means and the second means, the adjustment means being operative to permit adjustment of the magnitude of the second DC voltage.

20. An arrangement comprising:

a source providing AC power line voltage at a pair of AC terminals; and ballast means connected with the AC terminals and operative, periodically and intermittently, to draw power line current therefrom; the electronic ballast means having a set of output terminals connected with a gas discharge lamp and being operative to supply a high-frequency lamp current to this lamp; the frequency of the lamp current being substantially higher than the frequency of the AC power line voltage; the power line current, when indeed being drawn, consisting of one current pulse for each half-cycle of the AC power line voltage; the shape of the current pulses being such as to result in power being drawn from the AC terminals with a power factor of at least 85%;

whereby line current is drawn from the AC terminals in intermittent bursts; each burst consisting of plural current pulses and being separated from each other by one or more complete half-cycles of the AC power line voltage.

21. An arrangement comprising:

a source providing AC power line voltage at a pair of AC terminals; and electronic ballast means connected with the AC terminals and operative, periodically and intermittently, to draw power line current therefrom; the electronic ballast means having a set of output terminals connected with a gas discharge lamp and being operative to supply continuous operating power to this lamp; the power line current, when indeed being drawn, consisting of one burst of current pulses for each half-cycle of the AC power line voltage;

whereby line current is drawn from the AC terminals in intermittent bursts; each burst consisting of a first number of current pulses and being separated from each other by a second number of complete half-cycles of the AC power line voltage.

22. The arrangement of claim 21 wherein the ratio between the first number and the second number is a function of the magnitude of the operating power being supplied to the lamp.

23. An arrangement comprising:

a source providing AC power line voltage at a pair of AC terminals;

first rectifier means connected with the AC terminals and operative to provide a first unidirectional current to a first set of DC terminals; a first DC voltage existing at the first DC terminals;

first inverter means connected with the first DC terminals and operative to provide a first alternating voltage at a first output;

second rectifier means connected with the first output and operative to provide a second unidirectional current to a second set of DC terminals; a second DC voltage existing at the second DC terminals;

second inverter means connected with the second DC terminals and operative to provide a second alternating voltage at a second output;

gas discharge lamp having lamp terminals; and matching means connected between the second high-frequency output and the lamp terminals.

24. The arrangement of claim 23 wherein the instantaneous absolute magnitude of the first DC voltage is substantially equal to that of the AC power line voltage.

25. The arrangement of claim 24 wherein the magnitude of the second DC voltage is substantially constant.

* * * * *